United States Patent
Baker

[11] 3,785,392
[45] Jan. 15, 1974

[54] FLOW CONTROL VALVE
[75] Inventor: Charles H. Baker, Parma, Ohio
[73] Assignee: Eaton Corporation, Cleveland, Ohio
[22] Filed: Oct. 21, 1971
[21] Appl. No.: 191,269

[52] U.S. Cl............. 137/117, 137/625.37, 251/205
[51] Int. Cl............................................. F16k 21/00
[58] Field of Search.................... 251/205; 137/117, 137/625.3, 625.34, 625.37

[56] References Cited
UNITED STATES PATENTS

| 51,037 | 11/1865 | Gardner et al................. | 137/625.34 |
| 2,583,539 | 1/1952 | Bashark et al................. | 137/625.37 |
| 2,117,182 | 5/1938 | Lewis............................... | 137/625.3 |
| 3,072,147 | 1/1963 | Allen et al...................... | 251/205 X |
| 3,099,999 | 8/1963 | Vismara........................ | 137/625.3 X |
| 3,384,338 | 5/1968 | Dermody........................... | 251/205 |
| 3,411,416 | 11/1968 | Herd et al........................ | 91/451 |

Primary Examiner—Irwin C. Cohen
Attorney—Teagno & Toddy

[57] ABSTRACT

A flow control valve for providing a selected rate of fluid flow to a controlled fluid operated device. The valve includes a flow control member which is axially movable to select the flow rate of fluid to be supplied to the fluid operated device. The flow control member is operable to establish a flow control orifice having an area linearly proportional to the axial position of the flow control member. A pressure compensating device maintains a constant pressure drop across the orifice and thus the valve provides a controlled flow rate of fluid which is linearly proportional to the axial position of the control member.

4 Claims, 15 Drawing Figures

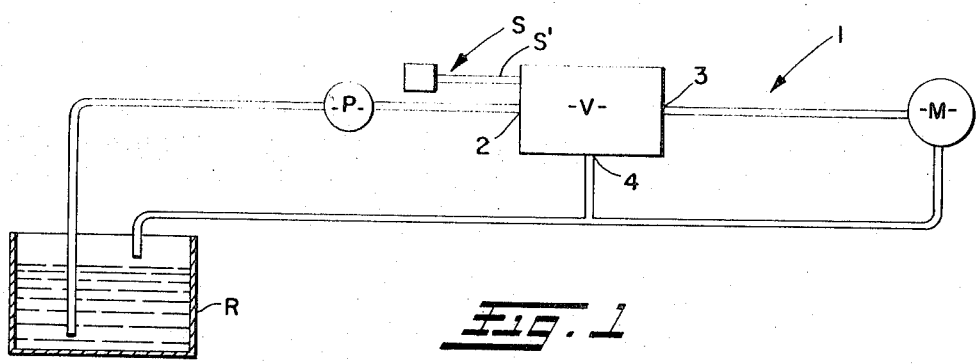
Fig. 1
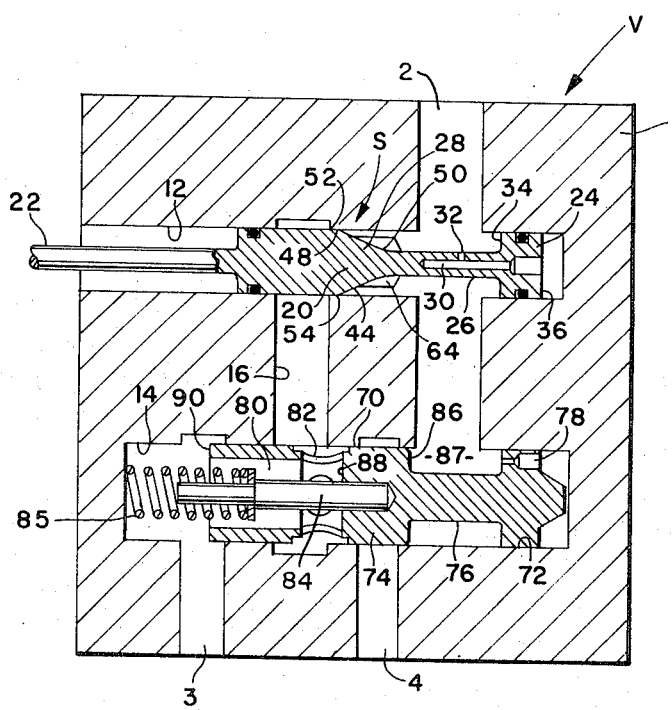
Fig. 2
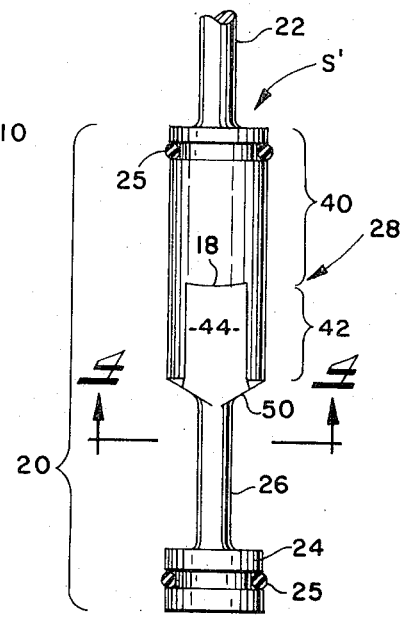
Fig. 3
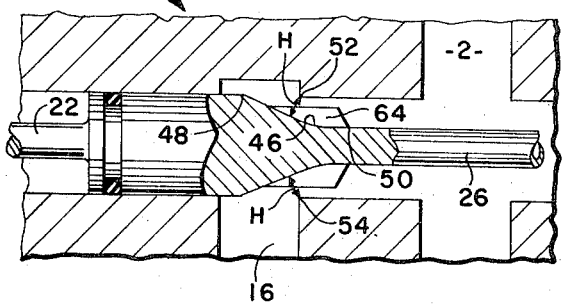
Fig. 5
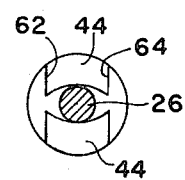
Fig. 4
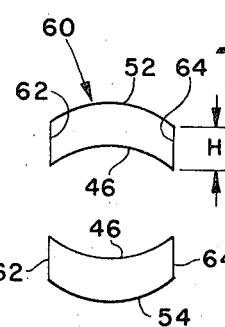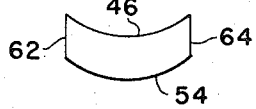
Fig. 5a

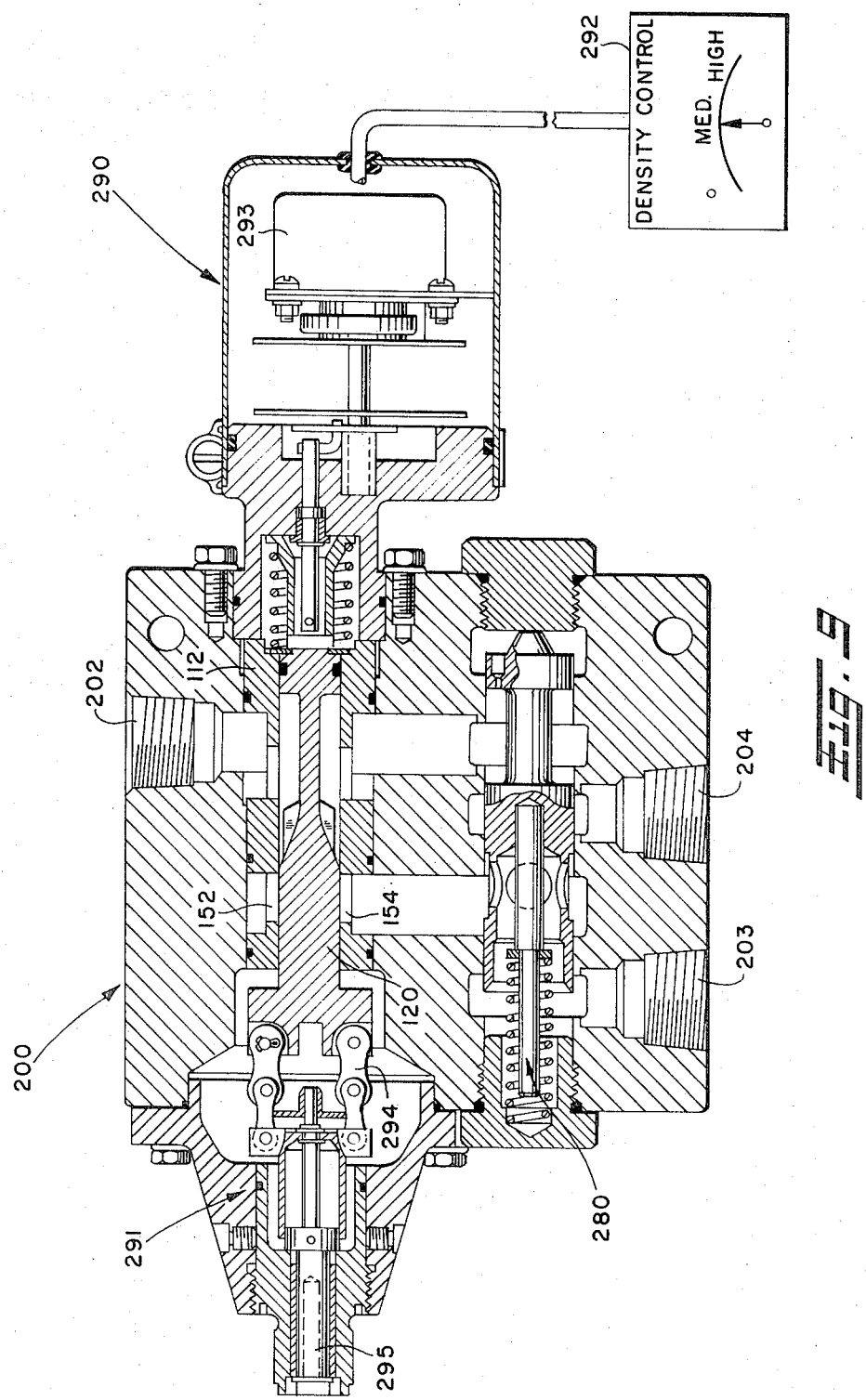

FLOW CONTROL VALVE

BACKGROUND OF THE INVENTION

1. Field of the Invention

This invention relates to flow control valves and more particularly to flow control valves having an axially movable control member for selecting a controlled flow rate which is linearly proportional to the axial position of the control member.

2. Description Of The Prior Art

The prior art includes many varieties of flow control valves having axially movable control members for selectively providing a constant flow rate of fluid for controlling a fluid operated device. However, the prior art does not include a flow control valve capable of supplying a selected constant flow rate which is linearly proportional to the axial position of the movable control members. A linearly proportional controlled flow rate is especially important when the control member is operated by a linear feed-back system in response to a preselected variable parameter such as ground speed, air speed, temperature, pressure and the like. As a linearly proportional controlled flow rate is often highly desirable for controlling a fluid operated device, the prior art valves are less than satisfactory.

SUMMARY OF THE INVENTION

In accordance with the present invention, the disadvantages of the prior art have been overcome to the extent that a flow control valve capable of supplying a selected, controlled flow rate of fluid which is constantly linearly proportional to the axial position of the flow control member is provided.

The control member includes a surface slidably and sealingly engaged in a bore having an inlet and a radial controlled flow outlet. The surface has a constant width, contoured, axial groove therein which is radially inwardly inclined towards the inlet at a constant rate of inclination with respect to the axis of the control member. The contoured bottom of the groove matches the contour of the bore and thus provides a constant geometry flow control orifice of linearly increasing area as the control member is axially moved towards the radial outlet to register the groove with the radial outlet.

An object of the present invention is to provide an improved flow control device.

A further object of the present invention is to provide an improved flow control device for supplying a selected substantially constant flow rate of fluid to a fluid operated device which is linearly proportional to the axial position of a control member.

Other objects and advantages of the present invention will become apparent from the following detailed description taken in connection with the accompanying drawing.

BRIEF DESCRIPTION OF THE DRAWING

FIG. 1 is a schematic representation of a typical system utilizing the present invention.

FIG. 2 is a cross-sectional view of one embodiment of the present invention.

FIG. 3 is plane view of the control member of the embodiment of FIG. 2.

FIG. 4 is a section view taken along line 4—4 of FIG. 3.

FIG. 5 is a detailed fragmentary sectional view of the embodiment shown in FIG. 2.

FIG. 5a is a partial sectional view of the flow control orifices of FIG. 5.

FIG. 9 is a sectional view of a control valve utilizing the embodiment of FIG. 6.

DESCRIPTION OF THE PREFERRED EMBODIMENT

Figure 6:
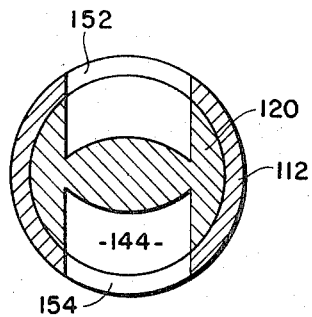
FIG. 6 is a fragmentary sectional view of another embodiment of the present invention in a first operational position.

A typical system utilizing the present invention may be seen by reference to FIG. 1. System 1 comprises a fluid reservoir R, a pump P, a flow control valve V, a selector or controller S and a fluid operated device M. Pump P supplies pressurized fluid to control valve inlet 2. The control valve supplies a selected constant flow rate of fluid to fluid operated device M through controlled flow outlet 3 and returns excess fluid to the reservoir R through excess flow port 4. Selector S includes an axially movable control member S' whose axial position is linearly proportional to the flow rate which will flow from controlled flow outlet 3. Selector S may comprise any mechanical, hydraulic, or electrical device for selectively axially moving control member S' and may be actuated in response to any given variable parameter in regards to which it is desired to control fluid operated device M.

The detailed operation of control valve V may be seen by reference to FIG. 2 in which valve housing 10 has an inlet 2, a controlled flow outlet 3 and an excess flow outlet 4. The housing 10 also includes a longitudinal cylindrical flow control bore 12 and longitudinal cylindrical pressure-compensating bore 14. The inlet 2 intersects bores 12 and 14 while the controlled flow and excess flow outlets, 3 and 4 respectively, intersect bore 14 only. A passage 16 intersects bores 12 and 14 at a point axially offset from inlet 2.

Control member S' includes a flow control spool 20 which is sealingly and slidably disposed in flow control bore 12 and an axial positioning rod 22 which extends from housing 10 for axial positioning of control member S'. The flow control spool 20 includes a supporting land 24, a reduced diameter stem 26 and a metering land 28 which controls the flow of fluid from bore 12 into passage 16. Lands 24 and 28 may carry O-rings 25 or the like for sealing engagement of bore 12 or may simply engage bore 12 in a member to member sealing relationship. An axial bore 30 opening at supporting land face 36 intersects a radial bore 32 which opens to the exterior of stem 26 for equalizing pressure on both faces, 34 and 36, of supporting land 24 thereby eliminating pressure buildup which might hinder the axial movements of control member S'.

Referring to FIGS. 2–5 the structure of metering land 28 may be appreciated in greater detail. Metering land 28 includes a portion 40 which is sealingly and slidably engaged in bore 12 and is sufficiently long to seal passage 16 from bore 12. Metering land 28 also includes the grooved portion 42. Grooved portion 42 includes a contoured, constant width groove 44 which is radially inwardly sloping towards the inlet 2 at a constant rate of inclination relative to the axis of control member S'. The contoured bottom 46 of groove 44 matches the exterior contour of land 28 and the interior contour of bore 12. It should be noted at this time that the contoured groove axial limits which are defined by the upper and lower groove edges, 48 and 50 respectively, are also of the same contour and thus form true parallel lines with respect to the upper and lower circumferential edges, 52 and 54 respectively of the intersection of bore 12 and passage 16.

As flow control member S' is moved to the left, flow control orifices 60 between bore 12 and passage 16 are defined by grooves 44 and the upper and lower intersection edges, 52 and 54, of bore 12 and passage 16. As may be seen from FIG. 5A, the orifices 60 are defined by upper and lower parallel edges defined by the bore and the groove bottom respectively and parallel sides, 62 and 64, defined by the constant width sides of groove 44. As the relative geometry of the orifice remains constant, its area is controlled by its height H, which is measured perpendicularly from groove bottom 46 to the circumferential edges 52, 54 and is linearly proportional to the axial position of control member S'. The constant geometry is also important as it maintains a substantially constant coefficient of flow through orifice 60.

Slidably and sealingly disposed in pressure-compensating bore 14 is pressure-compensating piston 70. Pressure-compensating piston 70 includes a supporting land 72, a pressure-compensating land 74, and a stem 76 interposed lands 72 and 74. Supporting land 72 includes a restricted orifice 78 therethrough for equalizing pressures on both sides thereof. Land 74 includes an axial bore 80 partially therethrough for communication with the controlled flow outlet 3 and a radial bore 82 in communication between axial bore 80 and passage 16. A support rod 84 extends through bore 80 for guiding support of spring 85 which biases the pressure compensating piston to the right in which position land 74 seals excess flow outlet 4 from bore 14. Pressure-compensating piston 70 is on the right hand surface area of land 72 exposed to the inlet pressure and on the left, an equal surface area of land 74 is exposed to the outlet pressure of the controlled flow and to a force exerted by spring 85 so that the pressure drop across the orifice 60, multiplied by the cross-sectional area of the bore 14, equals the force exerted by spring 85 on piston 70, the spring 85 being selected so as to provide a desired pressure drop across the orifice 60.

In operation, a pump P is selected to provide valve V with pressurized fluid sufficient to operate fluid operated device M for all conditions. When flow control member S' is in a position whereby bore 12 is sealed from passage 16, the fluid entering inlet 2 will act upon pressure compensating piston surface 86 to overcome the bias of spring 85 thereby shifting the piston 70 to the left, opening the excess flow outlet 4 and allowing the pressurized fluid to return to the reservoir R. As flow control member S' is axially displaced to the left, the grooves 44 will register with the intersection defined by edges 52 and 54, of bore 12 and passage 16 establishing a flow control orifice 60 therebetween (See FIGS. 5 and 5a). Fluid will then flow through orifice 60 into passage 16 and from there through radial bore 82, axial bore 80 and out the controlled flow outlet 3 to the controlled fluid operated device M. If the inlet pressure which is sensed in both inlet 2 and the inlet pressure chamber 87 exceeds that pressure required to maintain the preselected pressure drop across orifice 60, the excess pressure will cause an unbalanced force upon pressure compensating piston 70 causing that piston to move to the left opening chamber 87 to excess flow port 4 and by-passing sufficient fluid to maintain the preselected pressure drop. The operation of pressure-compensating devices is well known in the art and may be explored in greater detail by reference to U.S. Pat. No. 3,411,416 assigned to the assignee of this invention.

As a substantially constant pressure drop and coefficient of flow is established through orifice 60, the rate of fluid flowing through the flow control orifice 60 to the fluid operated device will vary linearly with changes in the area of the orifice. The area of the orifice 60 is linearly proportional to the axial position of control member S' and thus the constant flow rate is linearly proportional to the axial position of the control member.

Figure 7:
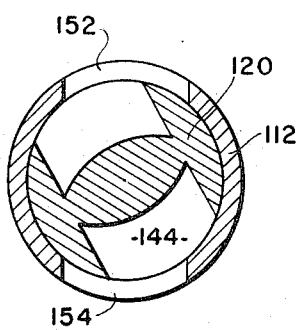
FIG. 7 is a sectional view of the embodiment of FIG. 6 in a second operational position.
Figure 8:
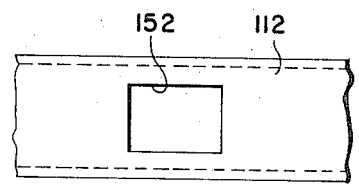
FIG. 8 is a plane view of the sleeve utilized in FIG. 6.
Figure 6A:
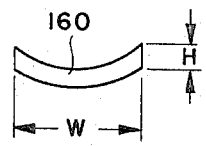
FIG. 6a is a perspective view of the flow control orifice in FIG. 6.
Figure 7A:
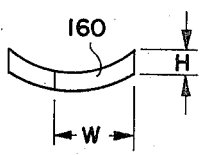
FIG. 7a is a perspective view of the flow control orifice of FIG. 7.

An alternate embodiment of the present invention may be seen by reference to FIGS. 6, 7 and 8 wherein the flow control spool 120 is mounted for relative rotational as well as axial movement. In this embodiment a sleeve 112 provides the bore in which the control member is mounted. Sleeve 112 has a plurality of radial apertures, 152 and 154, therethrough with which the metering slots 144 may be selectively registered. As is seen, the width of orifice 160 may be selectively varied by rotating the spool 120 in respect to sleeve 112. In this embodiment, a preselected maximum fluid flow, determined by the width W of orifice 160, may be selected by rotational adjustment and then the controlled flow wll be a percentage of the preselected maximum flow and will be linearly proportional to the axial position of the control member 120 which determines the height H of the orifice 160.

Figure 10:
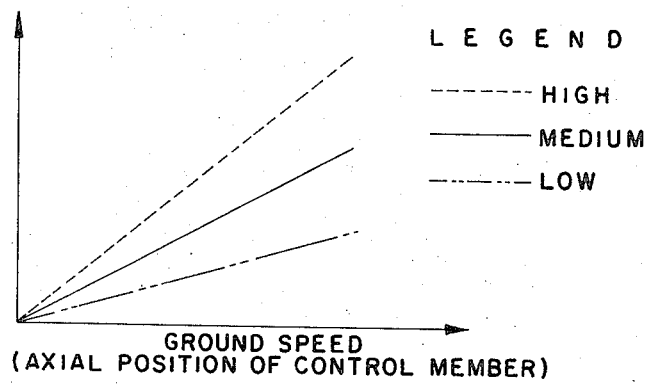
FIG. 10 is a graphical representation illustrating the flow rate plotted against the control member axial position for several settings of the valve of FIG. 9.

An application of the embodiment of FIGS. 6–8 may be seen by reference to FIG. 9. This valve 200 may be used to control the conveyor of a spreader system which is moving over the ground at varying speeds to spread a constant preselected density of material. Inlet 202 is connected to a source of pressurized fluid while outlets 203 and 204 are connected to the conveyor fluid motor and the reservoir respectively. The valve includes a rotary selector 290 for rotating control member 120 relative to sleeve 112 to select the density required and a ground speed sensing device 291 for axially moving control member S' linearly in response to ground speed. The valve also includes pressure compensating means 280. The density controller 290 may comprise a remote electrical density selector 292 and an electrical rotary slave system 293 as is well known in the art and described in greater detail in U. S. Pat. No. 3,381,936 assigned to the assignee of this invention. The ground speed sensing device may comprise a rotary governor 294 which is drivingly connected to a ground engaging wheel as at 295 to linearly move the control member 120 in response to ground speed. The response to ground speed and density selective of valve 200 may be seen by reference to FIG. 10 which shows controlled flow rate in response to ground speed for several settings of the density control. As may be seen in FIG. 10, the operator need merely select the density of material which he wishes to spread (high, medium or low). It is noted that the density of material spread will vary directly with conveyor speed which varies directly with fluid flow to the conveyor fluid motor. The control valve will maintain a selected constant density of spread material by linearly varying the conveyor in response to variations in sensed ground speed.

Figure 11:
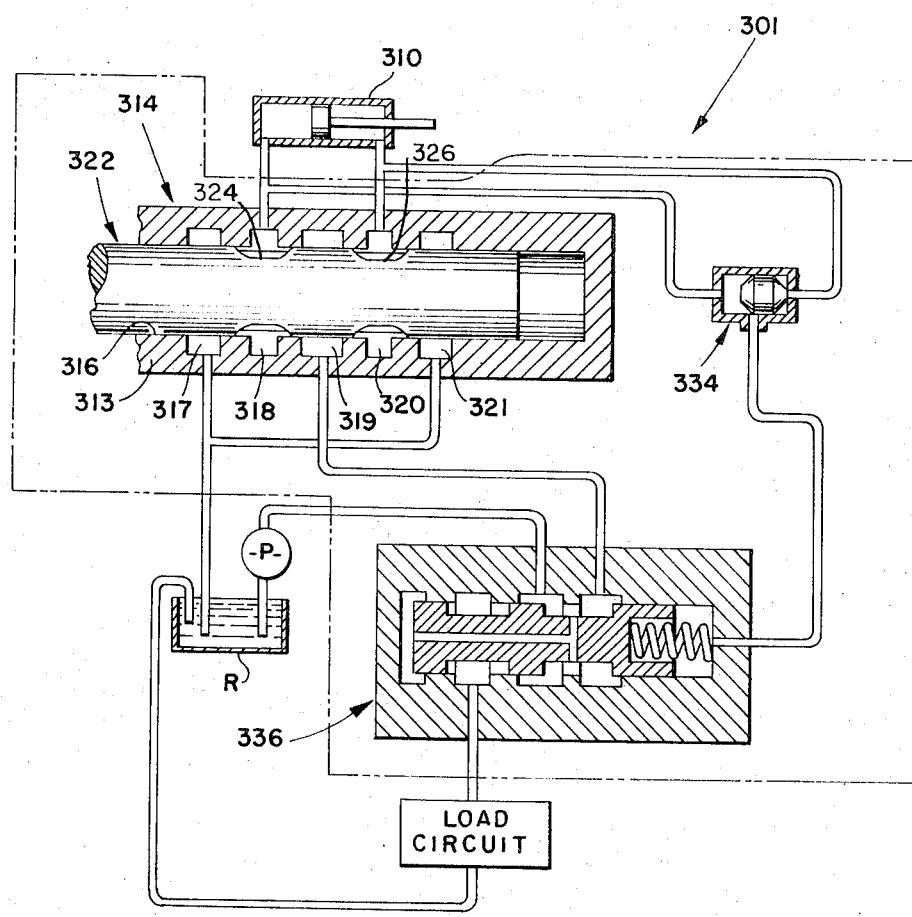
FIG. 11 is a sectional view of a further embodiment of the present invention.

A further modification of the present invention may be seen by reference to FIG. 11 which illustrates an adjustable, metered, directional flow control valve 301. Directional flow control valve 301 comprises a pressure-compensating section 336. The sections 314, 334 and 336 are illustrated in separate pieces but may be formed in a single housing as is well known in the art and is indicated by the dotted lines.

Directional control section 314 comprises a housing 315 having a longitudinal bore 316 therein. A plurality of annular recesses 317, 318, 319, 320 and 321 intersect the bore 315 at axially spaced locations along its length. Recess 319 provides an inlet for pressure-compensated fluid while recesses 318 and 320 provide motor ports leading to opposite sides of fluid operated device 310. Recesses 317 and 321 provide return ports leading to reservoir R. Slidably and sealingly disposed in bore 316 is control member 322 having axial grooves, 324 and 326, of the type shown in FIGS. 2–5 at spaced locations along its length.

Figure 12:
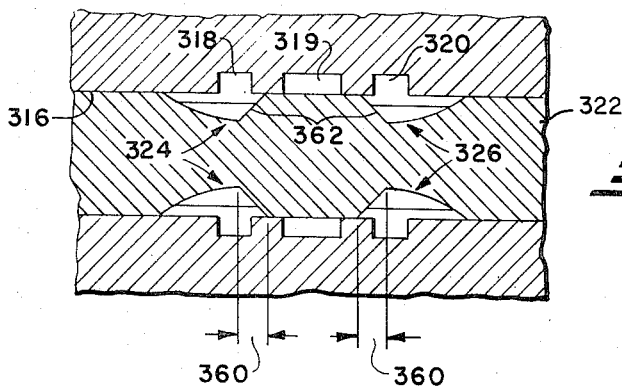
FIG. 12 is a detailed fragmentary section of the embodiment of FIG. 11.

Reference to FIG. 12 will indicate that grooves 324 and 326 have metering sections 360 at the inward ends thereof, the axial length of sections 360 being equal to the metering travel of control member 322. The metering sections 360 of grooves 324 and 326 are of constant width and are constantly inwardly sloping towards the ends of control member 322. The bottoms 362 of the metering sections are contoured to match the interior of bore 316 and thus the metering sections define a fluid flow control orifice between recesses 318 and 319 or 320 and 319 when the control member is shifted to the left or right respectively to register the slots 324 or 326 with inlet recess 319. As was the case with the embodiments described above, the area of these flow control orifices will be linearly proportional to axial position of control member 322.

Briefly, in operation, the flow control member is axially shifted to provide communication between the inlet 319 and a selected motor port, 318 or 320, and between the other motor port, 320 or 318, and a return port 321 or 317. The detailed operation of directional flow control valves may be further seen by reference to U.S. Pat. No. 3,455,210 assigned to the assignee of this invention.

Although this invention has been described in its preferred form with a certain degree of particularity, it is understood that the present disclosure of the preferred form has been made by way of example and that numerous changes in the details of construction and the combination and arrangement of parts may be resorted to without departing from the spirit and scope of the present invention as hereinafter claimed.

I claim:
1. A flow control valve comprising:
a housing having a bore with an inlet for connection to a source of pressurized fluid and a controlled flow outlet;
a control member slidably disposed in said bore, said control member cooperating with said outlet and having an axial groove for defining a flow control orifice between said inlet and said outlet, the area of said orifice being linearly proportional to the axial position of said control member, in all operable positions of said control member;
said groove being of a constant width with the bottom thereof being radially inwardly inclined at a constant rate of inclination with respect to the axis of said control member, the bottom of said groove having the same curvature and extending in the same direction as the interior surface of said bore;
control means for axially positioning said control member in response to a preselected variable parameter; and
pressure compensating means for maintaining a substantially constant pressure drop across said flow control orifice and maintaining flow linearly proportional to the position of said control member.

2. A flow control valve comprising:
a housing having a cylindrical cross-sectional bore therein, said bore having an inlet for connection to a source of pressurized fluid and a radial outlet for connection to a fluid operated device, said radial outlet partially defined by a circumferential edge towards said inlet; and
a control member for controlling the flow of fluid between said inlet and said outlet, said control member comprising a circumferential surface sealingly engaged in said bore and an end surface communicating with said inlet, said control member having an axially extending constant width groove defined by two parallel side walls and a curved bottom which is inclined radially inwardly from the circumferential surface at a constant rate of inclination with respect to the axis of the control member, the contoured bottom having the same curvature and extending in the same direction as the interior of said bore, said control member axially movable towards said outlet to selectively register said groove with said outlet defining a flow control orifice therebetween, the area of said orifice being linearly proportional to the axial position of said control member.

3. The flow control valve of claim 2 wherein said control member has a plurality of axially extending grooves equally circumferentially spaced about its circumference.

4. A spool for a flow control valve, said spool having an outer surface with a radius of curvature and an axial groove therein, said groove forming a flow control orifice, which orifice varies linearly with all positions of said spool, said groove having parallel side walls with the bottom thereof inclined to the axis of said spool and having the bottom in transverse section of the same radius of curvature and extending in the same direction as the outer periphery of said spool.

* * * * *